(12) United States Patent
Wang et al.

(10) Patent No.: US 12,439,490 B2
(45) Date of Patent: Oct. 7, 2025

(54) DRIVER FOR DRIVING A LOAD, SUCH AS A LED LOAD

(71) Applicant: SIGNIFY HOLDING B.V., Eindhoven (NL)

(72) Inventors: Yu Wang, Shanghai (CN); Jie Fu, Shanghai (CN); Zhiquan Chen, Shanghai (CN); Gang Wang, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 140 days.

(21) Appl. No.: 18/563,444

(22) PCT Filed: May 19, 2022

(86) PCT No.: PCT/EP2022/063567
§ 371 (c)(1),
(2) Date: Nov. 22, 2023

(87) PCT Pub. No.: WO2022/248329
PCT Pub. Date: Dec. 1, 2022

(65) Prior Publication Data
US 2024/0276611 A1    Aug. 15, 2024

(30) Foreign Application Priority Data

May 28, 2021  (WO) ................ PCT/CN2021/096800
Sep. 7, 2021   (EP) ..................................... 21195269

(51) Int. Cl.
*H05B 45/355*   (2020.01)
*H02M 1/00*     (2006.01)
(Continued)

(52) U.S. Cl.
CPC ........ *H05B 45/355* (2020.01); *H02M 1/0043* (2021.05); *H02M 1/15* (2013.01);
(Continued)

(58) Field of Classification Search
CPC .. H05B 45/355; H05B 45/36; H05B 45/3725; H02M 1/0043; H02M 1/15;
(Continued)

(56) References Cited

U.S. PATENT DOCUMENTS 6,144,564 A     11/2000  Fraidlin et al.
9,419,510 B2 *   8/2016  Liu ........................ H02M 1/14
(Continued)

FOREIGN PATENT DOCUMENTS

CN       112055448 A     12/2020

OTHER PUBLICATIONS

Yang, Ping, et al., "Double-Line Frequency Ripple Suppression of a Quasi-Single Stage AC-DC Converter," IEEE Transactions on Circuits and Systems—II: Express Briefs, vol. 67, No. 10, Oct. 2020 (5 Pages).

*Primary Examiner* — Renan Luque (57) ABSTRACT

A driving arrangement is provided for driving a load, comprising a driver input for receiving an input power and a driver output to be coupled to the load. A high frequency switch mode PFC converter converts the input power to a PFC converter power and a high frequency switch mode regulator has an output connected in series with the output of the PFC converter. A superimposed power from the PFC converter and the regulator with synchronized high frequency switching is provided to the load. This enables a high frequency ripple to be at least partially cancelled. Wherein the charging phase of the PFC converter at least partially overlaps with the first phase of the regulator in which phase the regulated power increases.

14 Claims, 5 Drawing Sheets

(51) Int. Cl.
  *H02M 1/15* (2006.01)
  *H02M 1/42* (2007.01)
  *H05B 45/36* (2020.01)
  *H05B 45/3725* (2020.01)

(52) U.S. Cl.
  CPC .......... *H02M 1/4225* (2013.01); *H05B 45/36* (2020.01); *H05B 45/3725* (2020.01)

(58) Field of Classification Search
  CPC ............. H02M 1/4225; H02M 1/0009; H02M 1/4208; H02M 1/4258; H02M 3/155; H02M 3/33561
  See application file for complete search history.

(56) References Cited

U.S. PATENT DOCUMENTS

| | | |
|---|---|---|
| 10,015,849 B2 | 7/2018 | Liu |
| 2013/0241438 A1 | 9/2013 | Suzuki |
| 2017/0079095 A1* | 3/2017 | Fang ..................... H02M 1/143 |
| 2018/0248472 A1* | 8/2018 | Qiu ....................... H02M 1/143 |
| 2019/0157978 A1 | 5/2019 | Ni |

* cited by examiner

DRIVER FOR DRIVING A LOAD, SUCH AS A LED LOAD

CROSS-REFERENCE TO PRIOR APPLICATIONS

This application is the U.S. National Phase application under 35 U.S.C. § 371 of International Application No. PCT/EP2022/063567, filed on May 19, 2022, which claims the benefit of International Application No. PCT/CN2021/096800, filed on May 28, 2021 and European Patent Application No. 21195269.2, filed on Sep. 7, 2021. These applications are hereby incorporated by reference herein.

FIELD OF THE INVENTION

This invention relates to driving arrangements, in particular based on high frequency switch mode power converters.

BACKGROUND OF THE INVENTION

AC/DC converter circuits are used to provide power conversion from a mains input power to create a DC power supply for a load.

A function implemented within a power converter which is supplied with mains power (or other AC power) is power factor correction (PFC). The power factor of an AC electrical power system is defined as the ratio of the real power flowing to the load to the apparent power in the circuit. A power factor of less than one means that the voltage and current waveforms are not in phase and/or do not have the same shape. A phase shift for example reduces the instantaneous product of the two waveforms and the average power delivered over a mains cycle. The real power is the capacity of the circuit for performing work in a particular time. The apparent power is the product of the current and voltage of the circuit. Due to energy stored in the load and returned to the source, or due to a non-linear load that distorts the waveform of the current drawn from the source, the apparent power will be greater than the real power.

If a power supply is operating at a low power factor, a load will draw more current for the same amount of useful power transferred than for a higher power factor.

The power factor can be increased using power factor correction. For linear loads, this may involve the use of a passive network of capacitors or inductors. Non-linear loads typically require active power factor correction to counteract the distortion and raise the power factor. The power factor correction brings the power factor of the AC power circuit closer to 1 for example by supplying reactive power of opposite sign, adding capacitors or inductors that act to cancel the inductive or capacitive effects of the load.

Active PFC makes use of power electronics to change the waveform of the current drawn by a load to improve the power factor. Active PFC circuits are most commonly based on boost switch mode converter topologies. Non-isolated flyback or isolated flyback converter topologies may also be used. Active power factor correction can be single-stage or multi-stage.

In the case of a switch mode power supply, a PFC boost converter is for example inserted between a bridge rectifier and a storage capacitor at the output of the PFC circuit. The boost converter for example may attempt to maintain a constant DC bus voltage on its output while drawing a current that has the same frequency and shape as the line voltage and is always in phase with the line voltage.

A switch mode PFC circuit will have a low frequency ripple at 100 Hz or 120 Hz (depending on the mains frequency). If used in a LED lighting application, this means the current to the LED would have a low frequency ripple at 100 Hz or 120 Hz and this may cause ripple in the light output. Although this may be not visible to the naked human eye, it may still be visible via a digital camera/photography. Thus, it is problematic for applications wherein an image or video digitalization is involved, such as a sports event, stage show, studio broadcast, or even live personal host etc.

In order to solve this, a low power converter, such as a DC/DC converter, may be used to compensate for the low frequency ripple produced by the PFC converter. Here the term "low power" means the low power converter just needs to compensate the ripple portion of the output of the PFC converter, which is not the full output of the PFC converter, but only a certain percentage of the full output. The DC/DC topology may be a buck converter, buck-boost converter, or a full-bridge circuit. The input power to the DC/DC converter may a secondary output of the PFC converter or it may be generated by an auxiliary secondary winding. US 2018/0248472 discloses the use of a series ripple cancellation circuit for cancelling mains ripple.

Figure 1:
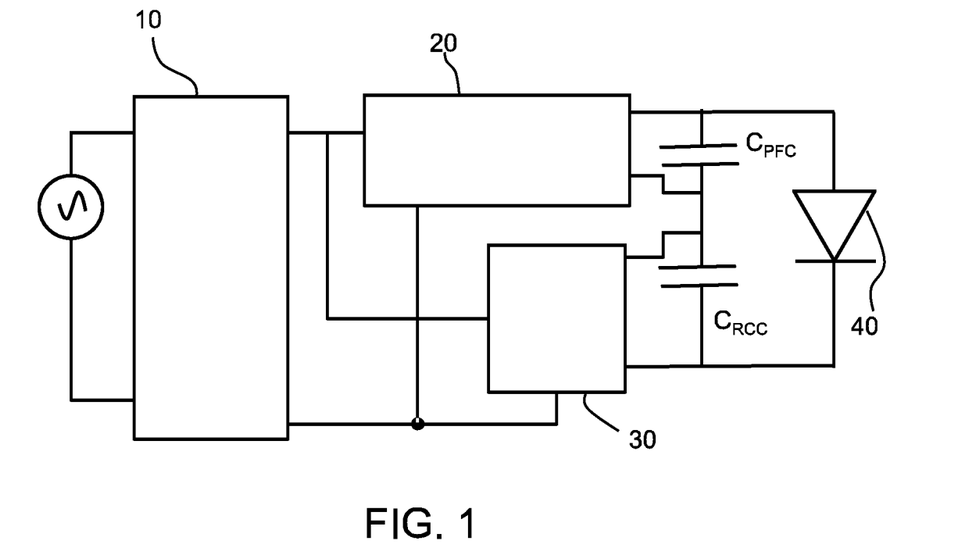
FIG. 1 shows in simplified form a known series ripple cancellation circuit for cancelling mains ripple.

FIG. 1 shows in simplified form the basic architecture disclosed in US 2018/0248472. The circuit comprises a rectifier 10, a PFC converter 20 and a DC/DC ripple cancellation converter 30. The two converters provide their outputs across respective storage capacitors $C_{PFC}$ and $C_{RCC}$ which are in series, and in parallel with the load 40, such as an LED arrangement.

The DC/DC converter 30 generates a voltage (or current) to be superimposed with the voltage (or current) of the PFC converter. When the PFC converter outputs a peak of the ripple at 100 Hz or 120 Hz, the DC/DC converter is controlled to output a valley value. Conversely, when the PFC stage outputs a valley of the ripple, the DC/DC converter outputs a peak value. Thus, the sum is more averaged.

CN112055448A also discloses a flyback PFC converter and a ripple suppression unit whose outputs are series connected for suppressing AC mains ripple. Wherein the ripple suppression unit provides output in a freewheeling phase of the flyback PFC converter.

In this type of circuit topology, it is beneficial to use a smaller storage capacitor $C_{PFC}$ (typically an E-cap) since the DC/DC converter counteracts the ripple. However a smaller E-cap causes a problem that it can address the low frequency ripple, but it is too small to able to filter the high frequency ripple caused by the high switching frequency of the PFC switch mode converter. The existence of the high switching ripple is verified through experiment and it may also cause ripple in the light output which may still be visible via digital photography.

SUMMARY OF THE INVENTION

There is therefore a need for a driving arrangement which is able to provide cancellation of a high frequency ripple caused by the commutation switching of the switch mode power converter, as well as low frequency ripple in the context of the above topology. The invention is defined by the claims.

It is an aim of the invention to provide a driving arrangement and driving scheme to reduce a high frequency switching ripple, in particular which may arise if a smoothing capacitor (E-cap) is made smaller or even removed. It is based on the use of a PFC converter, such as an AC/DC PFC converter and a (smaller) regulator, such as a DC/DC converter, with outputs in series. The concept of the invention is having the same synchronized high frequency switching between the PFC converter and the regulator so as to counteract the ripple caused by the high frequency switching of the PFC converter. More specifically, a rising output (at the high frequency) of one of the two converters can be timed with a falling output (at the high frequency) of the other; and vice versa. The high frequency synchronization is an addition to the already existing low frequency synchronization which is to counteract the low frequency 100 Hz or 120 Hz AC mains ripple of the PFC output. Thus, both the PFC 100 Hz or 120 Hz AC mains ripple and the high frequency switching ripple can be counteracted and the output is made smooth even with a small PFC output capacitor.

According to examples in accordance with an aspect of the invention, there is provided a driving arrangement for driving a load, comprising:
 a driver input for receiving an input power;
 a driver output to be coupled to the load;
 a high frequency switch mode PFC converter adapted to convert the input power to a PFC converter power at a PFC output;
 a high frequency switch mode regulator with a regulator output which is connected in series with the PFC output, wherein the regulator is adapted to provide a regulated power to be superimposed with the PFC converter power to provide a superimposed power which is applied across the driver output,
 wherein the high frequency switching of the PFC converter and the regulator are synchronized, characterized in that, the PFC converter has, in terms of the high frequency switching, a first phase in which the PFC converter power increases and a second phase in which the PFC converter power decreases wherein the first phase is a freewheeling phase and the second phase is a charging phase, and the regulator has, in terms of the high frequency switching, a first phase in which the regulated power increases and a second phase in which the regulated power decreases, and the charging phase of the PFC converter at least partially overlaps with the first phase of the regulator.

The PFC converter functions as the main power converter. However, to control a high frequency ripple caused by the power factor correction, for example corresponding to the high frequency switching of the PFC converter, the additional (smaller) switch mode regulator, which is already used to counteract the low frequency AC mains ripple, is re-used and synchronized with the high frequency switching of the PFC converter. In this way, the high frequency ripple is controlled by superimposing the PFC converter and regulator outputs, in addition to the control of the low frequency AC mains ripple. This means a smaller electrolytic capacitor filter (or even no electrolytic capacitor) can be used in the circuit. The high frequency switching is for example at 100 kHz or 120 kHz, typically 50 kHz or higher. It is noted that the invention is based on the above concerned topology wherein the outputs of the PFC converter and the regulator are connected in series to power the load, so that the outputs are added together i.e. superimposed. It is known to provide two converters connected in parallel (i.e. the outputs are connected in parallel) and synchronized in high switching frequency to make the total output smooth. However, this is a very different type of topology to that employed in the present invention.

The switch mode regulator for example handles a power which is 10% to 20% of the power handled by the PFC converter. The ripple component of the PFC output in the low frequency is usually at most 10% to 20% of the total PFC output, thus it is enough that the power rating of the switch mode regulator is 10% to 20% of the power rating of the PFC converter.

Most importantly, the PFC converter has a decreasing power in the charging phase but meanwhile the regulator has an increasing power in its first phase, the two powers compensate with each other thus the superimposed power is smoothed in the charging phase in term of the high frequency switching.

More specifically, an inductor of the PFC converter is charged in the charging phase and the inductor discharges to the load in the freewheeling phase. This further clarifies the charging phase and the freewheeling phase of an inductor-based converter. It should be noted that the present application is not limited to inductor-based converter. The present application also applies to capacitor-based converters which commutate between the charging phase and the freewheeling phase of the capacitors.

Preferably, the first phase of the PFC converter at least partially overlaps with the second phase of the switch mode regulator,
 thereby the superimposed power has a limited peak to valley value, in terms of the high frequency switching.

Thus, the PFC converter has an increasing power when the regulator has a decreasing power, so that the superimposed signal at least partially cancels the high frequency ripple in the PFC output power.

The first phase of the PFC converter may fully overlap with the second phase of the regulator and the second phase of the PFC converter may fully overlap with the first phase of the regulator.

The duty cycle of the high frequency switching of the PFC converter and of the regulator are for example each 50%. In this way, the cancellation of the high frequency ripple is optimum.

However, in many other situations, the duty cycle of the high frequency switching of the PFC converter and of the regular may instead not be 50%, and for those situations the first phase of the PFC converter (only) partially overlaps with the second phase of the switch mode regulator and/or the second phase of the PFC converter (only) partially overlaps with the first phase of the switch mode regulator. In this case, the high frequency ripple of the PFC output can be at least partially counteracted, though not fully, and it still has the benefit of reduced high frequency ripple.

The PFC converter preferably functions as a master controller and is adapted to set the frequency and timing base of the high frequency switching of the regulator. The PFC converter for example sets the frequency and start point (i.e. setting the time base) of the regulator switching. However, the duty cycles may be set independently. It is to be noted that the duty cycle of the regulator may vary in a low frequency since it needs to generate a low frequency and opposite waveform to the low frequency PFC output. Thus, the master controller may dynamically set the timing of the regulator at the low 100 Hz or 120 Hz frequency so as to have optimum high frequency ripple cancellation all the time.

The PFC converter preferably comprises an AC/DC converter and the regulator comprises a DC/DC converter, and the high frequency is at least 50 kHz. The AC/DC converter is the main converter and the DC/DC converter is used for high frequency ripple suppression.

Thus, the PFC converter preferably has a higher output power than the regulator, and the regulator is adapted to take either the main input (e.g. after rectification) or the PFC converter output as its input. The output power of the regulator is for example at most 20% of the output power of the PFC converter.

The PFC converter is for example a switch mode converter for which the output power increases when a high frequency commutation switch thereof is on or off, and the regulator may then be a switch mode converter for which the output power decreases when a high frequency commutation switch thereof is on or off.

The two converters can be turned on/off at the same time to provide the desired compensation, because one presents an increasing power (voltage) during a certain state of the high frequency switch and the other presents a decreasing power (voltage) during another certain state of the high frequency switch. The two certain states can be the same or opposite.

For example, the PFC converter may be a boost converter (PFC output power increases when the switch is on) and the regulator may be a buck converter (power decreases when the switch is off). The first phase of the boost converter is the freewheeling phase when a switch of the boost converter is off and the second phase of the boost converter is the charging phase when the switch of the boost converter is on.

Alternatively, the PFC converter may be a flyback converter (PFC output power increases when the switch is off) and the regulator may be a buck converter (power decreases when the switch is off). The first phase of the flyback converter is the freewheeling phase when a switch of the flyback converter is off and the second phase of the flyback converter is the charging phase when the switch of the flyback converter is on.

To be noted, these are only examples. Indeed various combinations of converter architecture may be used, including both of the same type or different types.

On top of the above high frequency compensating, the output power of the regulator may also be for compensating a variance in the PFC converter power caused by an output ripple in terms of the frequency of a mains input power.

Thus, a low frequency ripple may also be compensated.

In this case, the PFC converter for example has an AC mains input for receiving mains input power and provide the PFC converter power with a low frequency ripple corresponding to the frequency of mains input power. The regulator is then controlled cyclically with a control cycle synchronized with the frequency of the mains input power so as to output a regulator output with the low frequency ripple but in an offset phase with the PFC converter power, preferably a 180 degree offset phase to counteract the low frequency ripple of the PFC converter power.

This keeps the superimposed power stable, in terms of the frequency of the mains input power.

In this way, the regulator is also used to compensate for an AC mains low frequency ripple (e.g. 120 Hz after rectification) in the PFC converter power.

The invention also provides a method of delivering power to a load, comprising:
  receiving AC mains input power;
  providing the AC main input power to a high frequency switch mode PFC converter thereby to output a PFC converter power;
  operating a high frequency switch mode regulator thereby to provide a regulator output which is connected in series with the PFC output thereby to superimpose the regulator output with the PFC converter power to provide a superimposed power; and
  delivering the superimposed power to the load,
  wherein the high frequency switching of the PFC converter and the regulator are synchronized.

The method may comprise delivering more output power from the PFC converter than the regulator. The method may also comprise controlling the regulator cyclically with a control cycle synchronized with the AC mains input power. The PFC converter is for example used to set the frequency and timing of the high frequency switching of the regulator.

Preferably, in terms of the high frequency switching, the PFC converter comprises a first phase in which the PFC converter power increases and a second phase in which the PFC converter power decreases, and the regulator has, in terms of the high frequency switching, a first phase in which the regulated power increases and a second phase in which the regulated power decreases, wherein the first phase of the PFC converter at least partially overlaps with the second phase of the switch mode regulator and/or the second phase of the PFC converter at least partially overlaps with the first phase of the switch mode regulator. Therefore the ripple in the high frequency PFC output can be at least partially counteracted (i.e. compensated) by the high frequency regulator output, since the increasing of the PFC output is compensated by the decreasing of the regulator output, and vice versa.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a driving arrangement for driving a load, comprising a driver input for receiving input power and a driver output to be coupled to the load. A high frequency switch mode PFC converter converts the input power to a PFC converter power and a high frequency switch mode regulator has an output connected in series with the output of the PFC converter. A superimposed power from the PFC converter and the regulator with synchronized high frequency switching is provided to the load. This enables a high frequency ripple to be controlled, preferably at least partially cancelled.

Figure 2:
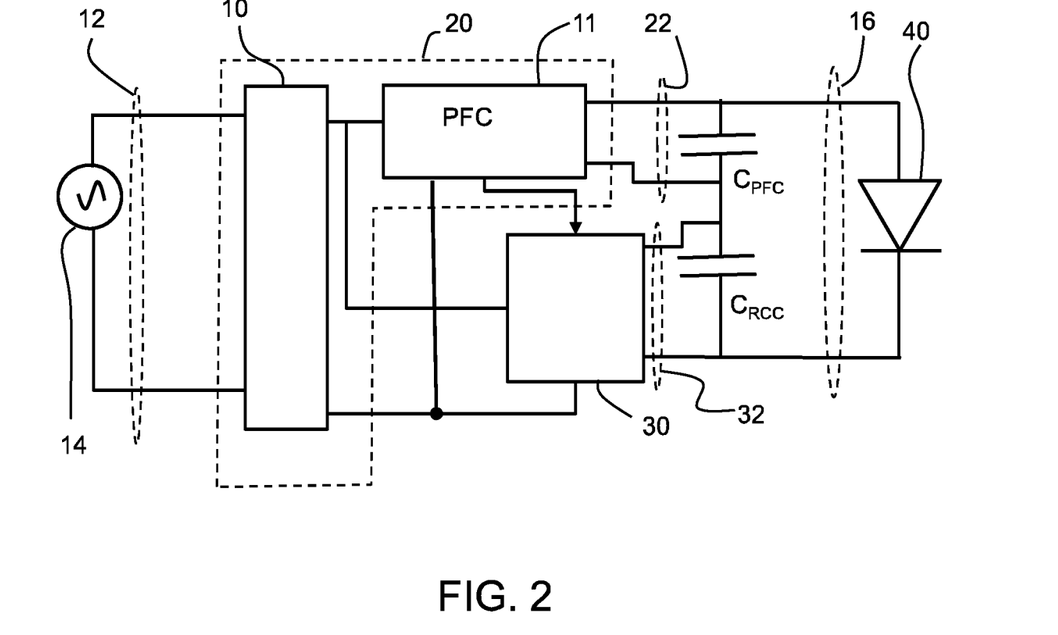
FIG. 2 shows an example of a driving arrangement as a modification to FIG. 1.

FIG. 2 shows a driving arrangement in accordance with the invention as a modification to FIG. 1. It has the same components as in FIG. 1. However, the PFC converter 20 acts as a master device which controls the switching frequency and timing of the DC/DC regulator 30. This timing control involves setting the start point of the switching cycle of the PFC converter relative to the start point of the switching cycle of the regulator. More preferably, in order to cancel the high frequency ripple, the timing control involves setting the start point of a duration that the PFC converter output increases relative to the start point of a duration that the regulator output decreases, and vice versa.

Note that the rectifier 10 and switch mode converter 11 may together be considered define the main PFC converter 20 so that the PFC converter 20 is an AC/DC converter and the regulator is a DC/DC converter.

The driving arrangement has a driver input 12 for receiving input power 14, and a driver output 16 to be coupled to the load 18.

The switch mode PFC converter 20 converts the input power to a PFC converter power at a PFC output 22 and the switch mode regulator 30 has a regulator output 32 which is connected in series with the PFC output 22. The regulator provides a regulated power which is superimposed with the PFC converter power to provide a superimposed power which is applied across the driver output 16.

The control coupling between the two converters 20, 30 is used to provide that the high frequency switching of the PFC converter 20 and the regulator 30 are synchronized, in particular with the same frequency and a proper relative timing of their switching cycles.

The PFC converter 20 functions as the main power converter. To reduce the high frequency ripple caused by the power factor correction, the regulator is synchronized with the high frequency switching. Preferably, the high frequency ripple is cancelled by superimposing the PFC converter output and regulator output. This means a smaller electrolytic capacitor filter (or even no electrolytic capacitor) can be used in the circuit in terms of providing both low frequency and high frequency smoothed output. The high frequency switching is for example at 50 kHz at minimum. The switch mode regulator 30 for example handles a power which is 10% to 20% of the power handled by the PFC converter 20.

Figure 3:
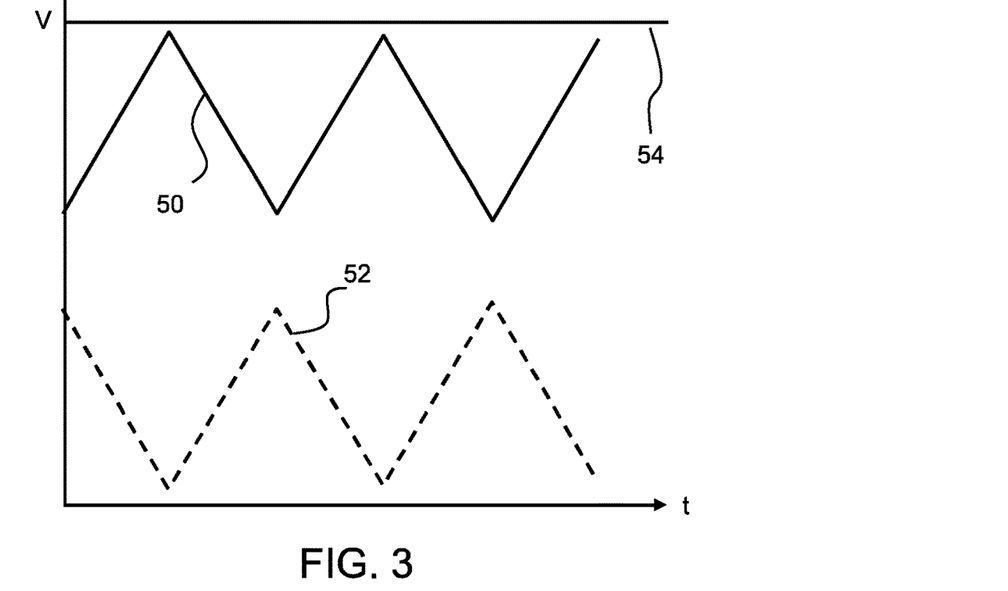
FIG. 3 shows a first example of how the output voltages of the PFC converter and the regulator of FIG. 2 may be interleaved.

FIG. 3 shows how the output voltages of the PFC converter and the regulator are interleaved. Plot 50 is the output from the PFC converter, plot 52 is the output from the regulator and plot 54 is the superimposed output voltage.

By providing the two outputs with the same frequency, but with an out-of-phase relationship, an interleaving is implemented, so that the resulting high frequency AC ripple component of the output voltage can be reduced.

FIG. 3 shows an example where each signal has a 50% duty cycle and there is full overlap of the rising portions of one signal with the falling portions of the other signal. In this case, the ripple is effectively reduced to zero.

More generally, the PFC converter 20 has, in terms of the high frequency switching, a first phase in which the PFC converter power increases and a second phase in which the PFC converter power decreases. The regulator 30 has, in terms of the high frequency switching, a first phase in which the regulated power increases and a second phase in which the regulated power decreases.

The first phase of the PFC converter at least partially overlaps with the second phase of the switch mode regulator. Preferably, the second phase of the PFC converter also at least partially overlaps with the first phase of the switch mode regulator. In this way, the superimposed power has a limited peak to valley value, in terms of the high frequency switching.

FIG. 3 thus shows an example in which the first phase of the PFC converter output fully overlaps with the second phase of the regulator, and the second phase of the PFC converter fully overlaps with the first phase of the regulator. Note that the scales used in FIG. 3 are only for illustrative purposes.

However, the 50% duty cycle for both the converter and the regulator is an ideal case but is not essential, so this full overlap is also not essential.

Figure 4:
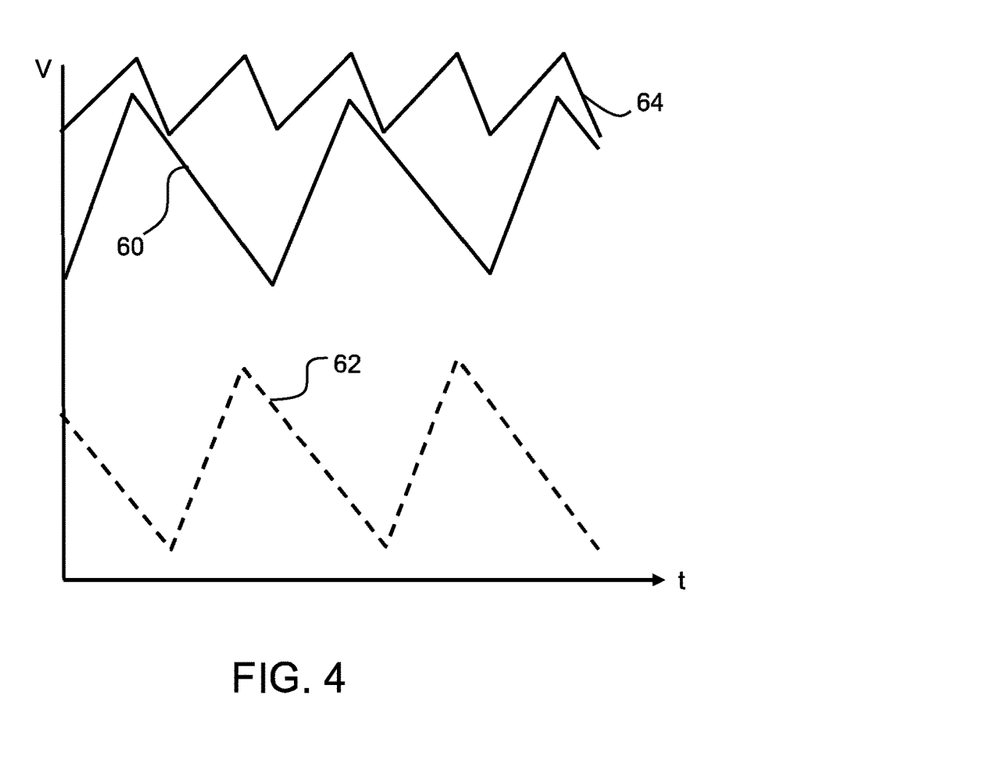
FIG. 4 shows a second example of how the output voltages of the PFC converter and the regulator of FIG. 2 may be interleaved.

FIG. 4 shows an example where the duty cycles of the two converters are not the 50%. Again, the scales used in FIG. 4 are only for illustrative purposes. Plot 60 is the output from the PFC converter, plot 62 is the output from the regulator and plot 64 is the superimposed output. Taking a flyback converter as the PFC converter, the plot 60 may correspond to a duty cycle of around 66%, and the on time of the flyback during which the output power is decreasing is 66%; taking the buck converter as the regulator, the plot 62 may correspond to a duty cycle of 34% and the on time of the buck converter during which the output power is increasing is 34%. By properly selecting a timing of the switching, the rising and falling portions of the outputs of the two drivers are again at least partially overlapping so that the sum remains smoothed, although a ripple remains in this example. It can be seen that the plot 64 is already smoother than the plot 60, even if there is still some ripple in the plot 64. So finally, an output with limited ripple is provided.

Figure 5:
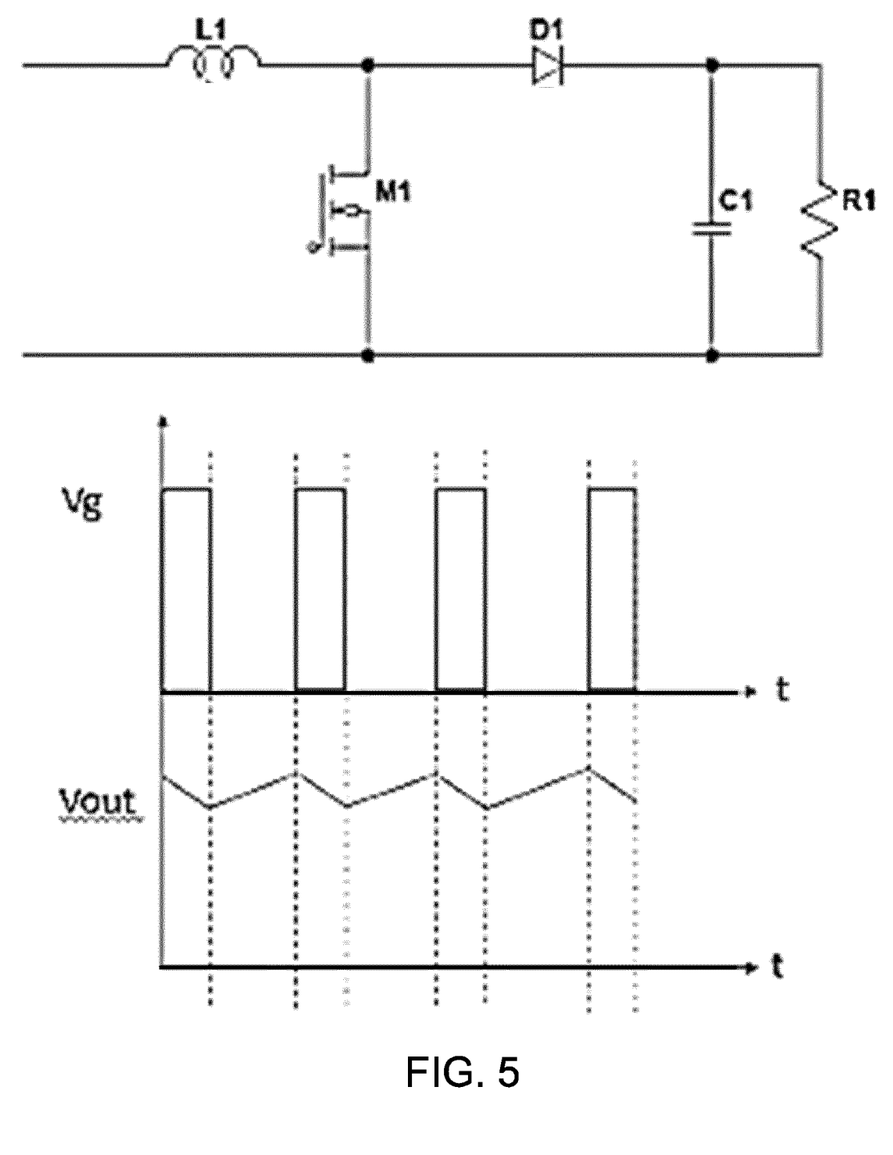
FIG. 5 shows the high frequency output voltage ripple for a boost converter.

FIG. 5 shows the output voltage ripple for a boost converter. The boost converter comprises a series inductor L1, a parallel main switch M1 (a MOS commutation transistor), a series output diode D1 and storage capacitor C1 in parallel with the load R1.

The timing diagram shows the gate drive signal Vg for the main switch which implements the high frequency (e.g. 50 kHz) switching, and the high frequency ripple in the output voltage is seen. As shown, when the main switch is turned on, the output voltage is in a decreasing phase as it is supplied with a discharging current from the storage capacitor, and the diode is non-conductive. When the main switch is turned off, the output voltage is in an increasing phase, with the output capacitor being charged from the inductor through the diode.

Figure 6:
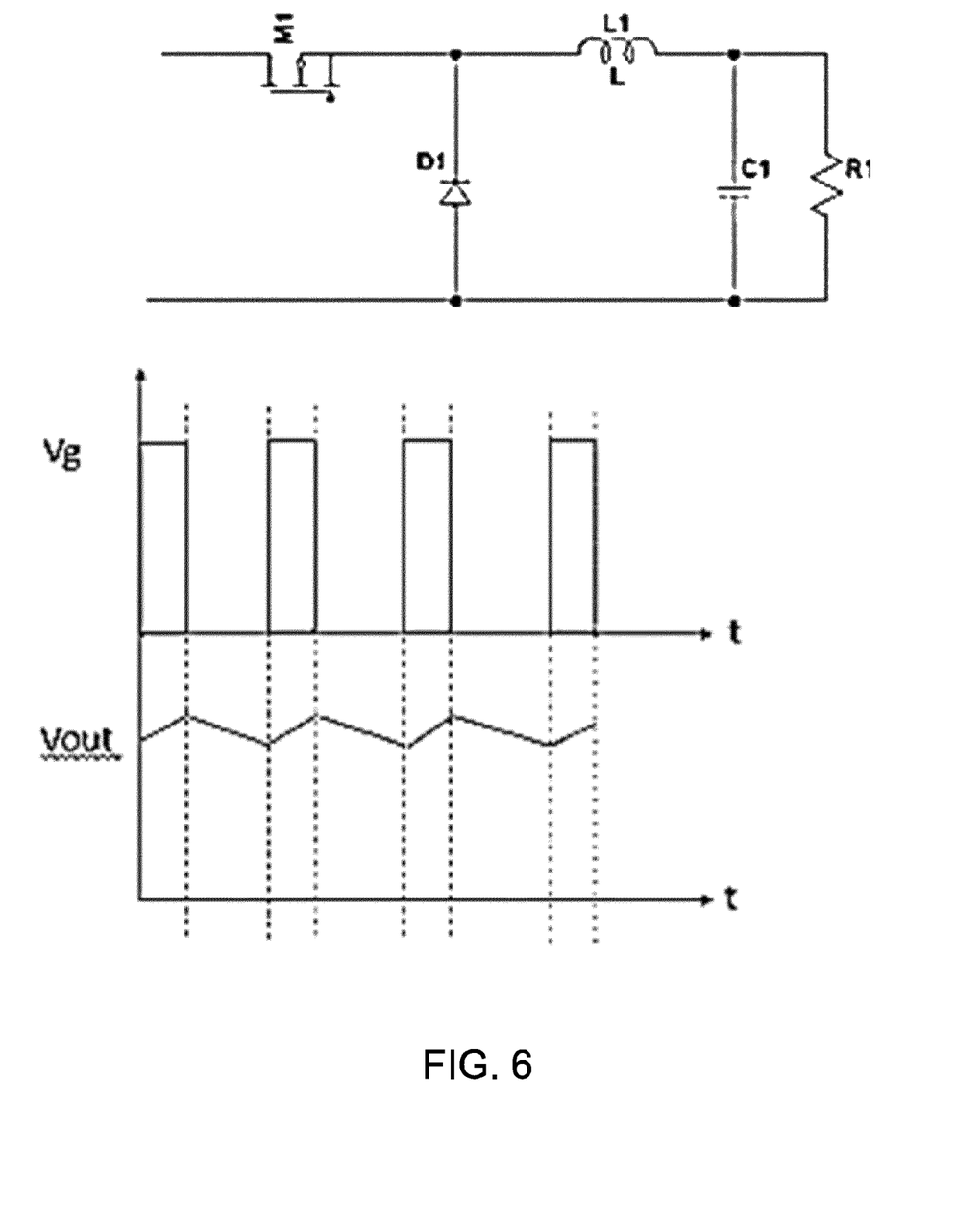
FIG. 6 shows the high frequency output voltage ripple for a buck converter.

FIG. 6 shows the output voltage ripple for a buck converter. The buck converter comprises a series main switch M1 (a MOS commutation transistor), a parallel diode D1, a series inductor L1, and storage capacitor C1 in parallel with the load R1.

The timing diagram again shows the gate drive signal Vg for the main switch which implements the high frequency (e.g. 50 kHz) switching, and the high frequency ripple in the output voltage is seen. As shown, when the main switch is turned on, the output voltage is in an increasing phase as the output capacitor is being charged from the inductor through the main switch. When the main switch is turned off, the output voltage is in a decreasing phase, with energy being discharged from the inductor through the diode.

Thus, it can be seen that different converter types have different output power variations in response to the switch state of the high frequency switch. In one implementation of the invention, one of the PFC converter and regulator is a switch mode converter for which the output power increases when a high frequency commutation switch is on, and the other of the PFC converter and regulator is a switch mode converter for which the output power decreases when a high frequency commutation switch is on.

For example, the PFC converter may be a boost converter and the regulator may be a buck converter. In this way, if the main switch of the boost and buck converters are on at the same time, the total output ripple is compensated. In this way, a single switch control signal may be used for controlling the main switch of both converters. In this way, the duty cycle and frequency are the same.

Alternatively, the PFC converter may be a flyback converter (for which the output power increases when the switch is off) and the regulator may be a buck converter (power decreases when the switch is off as shown in FIG. 6).

However, in other examples, as explained below, the duty cycles may be independently controlled, so that only the frequency and the time reference (i.e. the base timing) is synchronized between the PFC converter and the regulator.

Various combinations of converter architecture may be used, including both with the same response to the switching signal, in which case opposite polarity switching signals may be used. The PFC converter and regulator may even be of the same type.

Irrespective of the types of converter topologies used for the PFC converter and the regulator, the same switching frequency is used. Furthermore, the same start time is implemented. If the two converter types have the same output characteristic in response to the high frequency switching, the PWM switch control signals are timed to be 180° out of phase.

Figure 7:
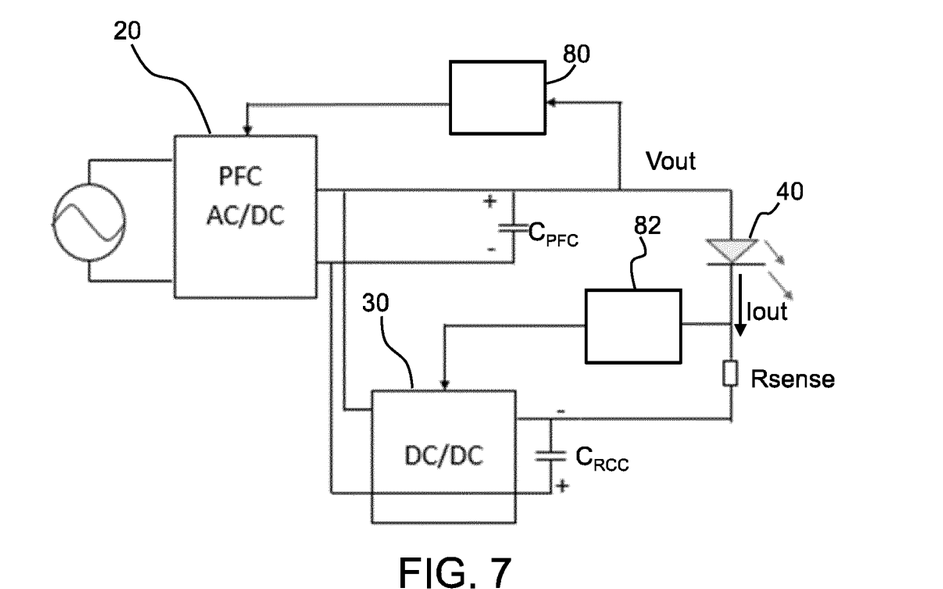
FIG. 7 shows a possible architecture in in more detail.

FIG. 7 shows a possible architecture, with an AC/DC PFC converter 20, the output from which supplies the DC/DC regulator 30. A constant voltage control block 80 is provided for controlling the PFC converter using feedback of the output voltage Vout. A constant current control block 82 is provided for controlling the regulator converter using feedback of the output current Iout measured using a current sense resistor Rsense.

The regulator input is in this example tapped from the output of the PFC converter instead of from the input as in the example above. The regulator in this arrangement adjusts its duty cycle to change its output in a 100 Hz or 120 Hz low frequency cycle as explained below.

The PWM switch control signals for the PFC converter and for the regulator have the same start time and frequency, as dictated by the PFC controller 80. The duty cycle for each part is however determined by independent control loops. In this example, the PFC duty cycle is decided by PFC output voltage feedback, and the regulator duty cycle is decided by LED current feedback, to keep the LED current constant so as to counteract the 100 Hz or 120 Hz ripple of the PFC converter output.

More specifically, the PFC converter output fluctuates with a low frequency e.g. 120 Hz ripple. As a result, the input to the regulator also fluctuates at this low frequency. The feedback control of the regulator means that the regulator is controlled cyclically with a control cycle synchronized with the frequency of the mains input power. Thus, the regulator output has a low frequency ripple but in an offset phase with respect to the output from the PFC converter power, preferably a 180 degree offset phase. It could well be that at the peak of the ripple of the PFC converter output, the regulator needs to output a valley current via a small duty cycle; and at the valley of the ripple of the PFC converter output, the regulator needs to output a peak current via a large duty cycle. This counteracts the low frequency ripple of the PFC converter output power and keeps the superimposed power stable, in terms of the frequency of the mains input power.

The control of the invention thus synchronizes the high frequency switching such that the rising and falling outputs of the two converters are at least partially overlapping, as explained above.

In this way, the low frequency ripple is removed by the high speed control loop of the regulator. The high frequency ripple is decreased efficiently by the serial interleaving as explained above. To realize the control logic, the two converters have a shared time base (i.e. frequency and set relative timing, i.e. set zero time point) but different control loops. This is simple to implement in a digital switch mode power supply system. An analog control approach is also possible, with the PFC controller implementing the time base and a controller of the regulator implementing a PWM synchronization function.

Thus, the synchronizing implemented by the invention does not need to maintain a constant overlapping relationship. Instead, the overlap can change with a cycle at the low 120 Hz frequency. In this way, the output power of the regulator also compensates for a variance in the PFC converter power caused by an output ripple at the low frequency of the mains input power.

Figure 8:
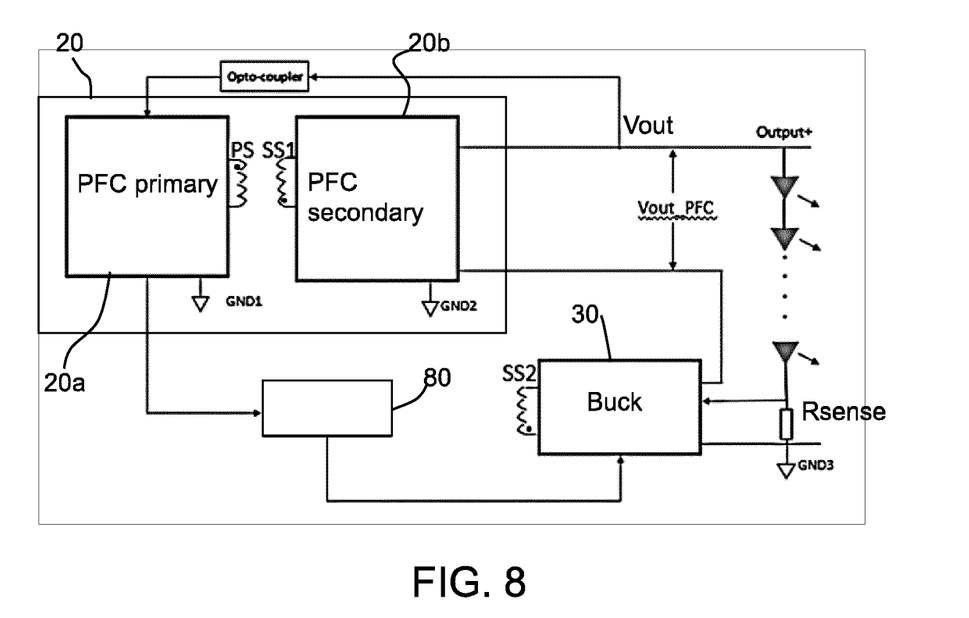
FIG. 8 show a more detailed implementation of the circuit of FIG. 7.

FIG. 8 show a more detailed implementation of the circuit of FIG. 7. The PFC converter 20 is a flyback converter with a primary side 20a with a primary side winding PS and a secondary side 20b with a secondary side winding SS1. The regulator 30 is a buck converter, with input power delivered from an auxiliary secondary side winding SS2.

The PFC converter functions as the master and the buck converter functions as the slave. The PWM switch control signals for the PFC converter and for the regulator have the same start time and frequency, as dictated by the PFC controller 80 but, as explained above, the duty cycles for the two converters are determined by the independent control loops.

The invention is of particular interest for driving a LED load, and may thus be used in lighting circuits. However, the invention may be applied to other loads.

The driving arrangement is for example a lighting driver, in particular a LED driver. The invention also provides a lighting circuit comprising a lighting driver as described above and a lighting load driven by the lighting driver, such as an LED load.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A driving arrangement for driving a load, comprising:
a driver input for receiving an input power;
a driver output to be coupled to the load;
a high frequency switch mode PFC converter adapted to convert the input power to a PFC converter power at a PFC output;
a high frequency switch mode regulator with a regulator output which is connected in series with the PFC output, wherein the regulator is adapted to provide a regulated power to be superimposed with the PFC converter power to provide a superimposed power which is applied across the driver output,
wherein the high frequency switching of the PFC converter and the regulator are synchronized, the PFC converter is adapted to, in terms of the high frequency switching, increase the PFC converter power in a rising portion of the PFC converter power and decreases the PFC converter power in a falling portion of the PFC converter power wherein the rising portion is a freewheeling phase and the falling portion is a charging phase, and the regulator is adapted to, in terms of the high frequency switching, increase the regulated power in a rising portion of the regulated power and decrease the regulated power in a falling portion of the regulated power, and
the falling portion of the PFC converter power at least partially overlaps with the rising portion of the regulated power and/or the rising portion of the PFC converter power at least partially overlaps with the falling portion of the regulated power.

2. The driving arrangement of claim 1, wherein an inductor of the PFC converter is charged in the charging phase and the inductor discharges to the load in the freewheeling phase,
the freewheeling phase of the PFC converter at least partially overlaps with the second phase of the regulator,
thereby the superimposed power has a limited peak to valley value, in terms of the high frequency switching.

3. The driving arrangement of claim 2, wherein the PFC converter is a flyback converter, the rising portion of the flyback converter power is the freewheeling phase when a switch of the flyback converter is off and the falling portion of the flyback converter power is the charging phase when the switch of the flyback converter is on, or
the PFC converter is a boost converter, the rising portion of the boost converter power is the freewheeling phase when a switch of the boost converter is off and the falling portion of the boost converter power is the charging phase when the switch of the boost converter is on, and
wherein the rising portion of the PFC converter power fully overlaps with the falling portion of the regulated power and the falling portion of the PFC converter power fully overlaps with the rising portion of the regulated power.

4. The driving arrangement of claim 3, wherein the duty cycle of the high frequency switching of the PFC converter and of the regular are each 50%.

5. The driving arrangement of claim 2, wherein the duty cycle of the high frequency switching of the PFC converter and of the regular are not 50%, and the rising portion of the PFC converter power partially overlaps with the falling portion of the regulated power and/or the falling portion of the PFC converter power partially overlaps with the rising portion of the regulated power.

6. The driving arrangement of claim 1, wherein the PFC converter functions as a master controller and is adapted to set the frequency and timing base of the high frequency switching of the regulator.

7. The driving arrangement of claim 1, wherein the PFC converter comprises an AC/DC converter and the regulator comprises a DC/DC converter, and the high frequency is at least 50 KHz.

8. The driving arrangement of claim 1, wherein the PFC converter has a higher output power than the regulator, wherein the regulator is adapted to take either the main input or the PFC converter output as its input.

9. The driving arrangement of claim 1, wherein:
the PFC converter is a switch mode converter for which the output power increases when a high frequency commutation switch is on or off, and
the regulator is a switch mode converter for which the output power decreases when a high frequency commutation switch is on or off.

10. The driving arrangement of claim 1, wherein the output power of the regulator is also for compensating a variance in the PFC converter power caused by an output ripple in terms of the frequency of a mains input power.

11. The driving arrangement of claim 10, wherein the PFC converter has an AC mains input for receiving mains input power and provide the PFC converter power with a low frequency ripple corresponding to the frequency of mains input power, and
wherein the regulator is controlled cyclically with a control cycle synchronized with the frequency of the mains input power so as to output a regulator output with the low frequency ripple but in an offset phase with the PFC converter power, preferably a 180 degree offset phase to counteract the low frequency ripple of the PFC converter power.

12. A lighting device comprising the driving arrangement according claim 1, and a light source connected to the driver output.

13. A method of delivering power to a load, comprising:
receiving AC mains input power;
providing the AC main input power to a high frequency switch mode PFC converter thereby to output a PFC converter power, the PFC converter is adapted to, in terms of the high frequency switching, increase the PFC converter power in a rising portion of the PFC converter powers and decrease the PFC converter power in a falling portion of the PFC converter power wherein the rising portion is a freewheeling phase and the falling portion is a charging phase;
operating a high frequency switch mode regulator thereby to provide a regulator output which is connected in series with the PFC output thereby to superimpose the regulator output with the PFC converter power to provide a superimposed power; and
delivering the superimposed power to the load,
wherein the method further comprising synchronizing the high frequency switching of the PFC converter and the regulator, and the regulator is adapted to, in terms of the high frequency switching, increases the regulated power in a rising portion of the regulated power and decrease the regulated power in a falling portion of the regulated power, and the falling portion of the PFC converter output at least partially overlaps with the rising portion of the regulated output and/or the rising portion of the PFC converter power at least partially overlaps with the falling portion of the regulated power.

14. The method of claim 13 comprising delivering more output power from the PFC converter than the regulator.

* * * * *